(12) United States Patent
Tsutsumi et al.

(10) Patent No.: US 10,714,715 B2
(45) Date of Patent: Jul. 14, 2020

(54) ELECTRIC STORAGE DEVICE

(71) Applicant: GS Yuasa International Ltd., Kyoto-shi (JP)

(72) Inventors: Masakazu Tsutsumi, Kyoto (JP); Hajime Kawamoto, Osaka (JP); Katsuhiko Okamoto, Kyoto (JP); Shinsuke Yoshitake, Kyoto (JP); Takuma Tonari, Kyoto (JP); Jun Nakamura, Kyoto (JP); Kenji Kouno, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 306 days.

(21) Appl. No.: 15/231,912

(22) Filed: Aug. 9, 2016

(65) Prior Publication Data

US 2016/0351866 A1     Dec. 1, 2016

Related U.S. Application Data

(63) Continuation of application No. 13/354,193, filed on Jan. 19, 2012, now abandoned.

(30) Foreign Application Priority Data

Jan. 20, 2011  (JP) ................................ 2011-009919
Jan. 20, 2011  (JP) ................................ 2011-009921

(51) Int. Cl.
*H01M 2/08* (2006.01)
*H01M 2/04* (2006.01)
(Continued)

(52) U.S. Cl.
CPC .............. *H01M 2/08* (2013.01); *H01G 9/016* (2013.01); *H01G 9/10* (2013.01); *H01G 11/70* (2013.01);
(Continued)

(58) Field of Classification Search
CPC .... H01M 2/08; H01M 2/0486; H01M 2/0473; H01M 2/30; H01M 2/02; H01M 2/0285;
(Continued)

(56) References Cited

U.S. PATENT DOCUMENTS 3,548,264 A   12/1970  Carino et al.
3,680,203 A    8/1972  Braiman et al.
(Continued)

FOREIGN PATENT DOCUMENTS

CN   2469557 Y   1/2002
CN   2701082 Y   5/2005
(Continued)

OTHER PUBLICATIONS

In re continuation U.S. Appl. No. 13/354,193, filed Jan. 19, 2012.
(Continued)

*Primary Examiner* — Eugenia Wang
(74) *Attorney, Agent, or Firm* — McGinn I.P. Law Group, PLLC.

(57) ABSTRACT

An electric storage device includes an electrode assembly, a case that includes a defining wall and houses the electrode assembly, a sealing member that is arranged on the defining wall, and a conductive member that is electrically connected to the electrode assembly, the conductive member being supported by the sealing member. At least a portion of the defining wall where the sealing member is arranged includes an aluminum-based metallic material. The sealing member includes a material that is softer than the material for the at least a portion of the defining wall where the sealing member is arranged. The sealing member includes polyphenylene sulfide (PPS) resin and an elastomer. The elastomer is contained in an amount of 2% to 20% by weight. The conductive member is crimped in such a manner that the sealing member is pressed against the defining wall.

13 Claims, 9 Drawing Sheets

(51) Int. Cl.

| | | |
|---|---|---|
| *H01G 11/74* | (2013.01) | |
| *H01M 2/02* | (2006.01) | |
| *H01G 9/10* | (2006.01) | |
| *H01G 9/008* | (2006.01) | |
| *H01G 11/70* | (2013.01) | |
| *H01G 11/82* | (2013.01) | |
| *H01G 11/84* | (2013.01) | |
| *H01M 2/30* | (2006.01) | |
| *H01M 10/0525* | (2010.01) | |
| *H01M 10/34* | (2006.01) | |
| *H01M 10/052* | (2010.01) | |

(52) U.S. Cl.
CPC ............ *H01G 11/74* (2013.01); *H01G 11/82* (2013.01); *H01G 11/84* (2013.01); *H01M 2/02* (2013.01); *H01M 2/0285* (2013.01); *H01M 2/0473* (2013.01); *H01M 2/0486* (2013.01); *H01M 2/30* (2013.01); *H01M 10/0525* (2013.01); *H01M 2/0217* (2013.01); *H01M 10/052* (2013.01); *H01M 10/345* (2013.01); *Y02E 60/13* (2013.01); *Y10T 29/4911* (2015.01)

(58) Field of Classification Search
CPC ........... H01M 2/0217; H01M 10/0525; H01M 10/052; H01M 10/345; H01G 11/70; H01G 11/84; H01G 11/82; H01G 11/74; H01G 9/10; H01G 9/016; Y10T 29/4911; Y02E 60/13
See application file for complete search history.

(56) References Cited

U.S. PATENT DOCUMENTS

| | | | |
|---|---|---|---|
| 3,686,538 | A | 8/1972 | Webster |
| 4,045,862 | A | 9/1977 | Evans et al. |
| 4,074,417 | A | 2/1978 | Pearce et al. |
| 5,360,685 | A | 11/1994 | Tanaka |
| 5,624,771 | A | 4/1997 | Sano et al. |
| 5,656,392 | A | 8/1997 | Sano et al. |
| 5,849,431 | A | 12/1998 | Kita et al. |
| 6,190,798 | B1 | 2/2001 | Okada et al. |
| 6,573,000 | B1 | 6/2003 | Miyazaki et al. |
| 6,579,640 | B1 | 6/2003 | Nagase et al. |
| 6,746,798 | B1 | 6/2004 | Hiratsuka et al. |
| 6,838,207 | B1 | 1/2005 | Sugita et al. |
| 7,335,442 | B2 | 2/2008 | Nakanishi et al. |
| 7,968,228 | B2 | 6/2011 | Park et al. |
| 8,598,471 | B2 | 12/2013 | Okamoto et al. |
| 8,748,034 | B2 | 6/2014 | Sasaki et al. |
| 2003/0118902 | A1 | 6/2003 | Schubert et al. |
| 2004/0023108 | A1 | 2/2004 | Nakanishi et al. |
| 2005/0000090 | A1 | 1/2005 | Ratte et al. |
| 2006/0003222 | A1 | 1/2006 | Mushiga et al. |
| 2006/0051664 | A1 | 3/2006 | Tasai et al. |
| 2006/0093907 | A1 | 5/2006 | Jeon et al. |
| 2007/0037053 | A1 | 2/2007 | Anantharaman |
| 2008/0131760 | A1 | 6/2008 | Yamagami et al. |
| 2008/0220316 | A1 | 9/2008 | Berkowitz et al. |
| 2009/0169989 | A1 | 7/2009 | Morikawa et al. |
| 2010/0021811 | A1 | 1/2010 | Kado et al. |
| 2010/0047686 | A1 | 2/2010 | Tsuchiya et al. |
| 2010/0081048 | A1 | 4/2010 | Nansaka et al. |
| 2010/0092858 | A1 | 4/2010 | Takashiro et al. |
| 2010/0129709 | A1 | 5/2010 | Matsubara |
| 2010/0173178 | A1 | 7/2010 | Kim et al. |
| 2011/0052977 | A1 | 3/2011 | Kurata et al. |
| 2011/0076543 | A1 | 3/2011 | Ro |
| 2011/0076552 | A1 | 3/2011 | Taniguchi et al. |
| 2011/0086253 | A1 | 4/2011 | Pompetzki et al. |
| 2011/0092111 | A1 | 4/2011 | Tsuchiya et al. |
| 2011/0159356 | A1 | 6/2011 | Tozuka et al. |
| 2011/0268999 | A1* | 11/2011 | Nagai ................. H01M 2/1241 429/53 |
| 2012/0160558 | A1* | 6/2012 | Okamoto ................. H01M 2/04 174/551 |
| 2012/0164522 | A1* | 6/2012 | Kawamoto ......... H01M 2/0426 429/179 |
| 2012/0258355 | A1 | 10/2012 | Guen |
| 2012/0264001 | A1 | 10/2012 | Tsuchiya et al. |
| 2012/0264003 | A1 | 10/2012 | Tsuchiya et al. |
| 2012/0264004 | A1 | 10/2012 | Tsuchiya et al. |
| 2012/0264005 | A1 | 10/2012 | Tsuchiya et al. |
| 2012/0264006 | A1 | 10/2012 | Tsuchiya et al. |

FOREIGN PATENT DOCUMENTS

| | | |
|---|---|---|
| CN | 101578723 A | 11/2009 |
| GB | 2 154 049 | 8/1985 |
| JP | 59-58754 A | 4/1984 |
| JP | H07-032490 A | 2/1995 |
| JP | 8-321287 A | 12/1996 |
| JP | 10-125291 A | 5/1998 |
| JP | 11-195561 A | 7/1999 |
| JP | 2000-268781 A | 9/2000 |
| JP | 2000-277081 A | 10/2000 |
| JP | 2001-093485 A | 4/2001 |
| JP | 2001-126684 A | 5/2001 |
| JP | 2001-357833 A | 12/2001 |
| JP | 2002-175797 A | 6/2002 |
| JP | 2002-245991 A | 8/2002 |
| JP | 2002-324541 A | 11/2002 |
| JP | 2003-92103 A | 3/2003 |
| JP | 2003-323869 A | 11/2003 |
| JP | 2003-346774 A | 12/2003 |
| JP | 2003-346778 A | 12/2003 |
| JP | 2004-296447 A | 10/2004 |
| JP | 3612629 B2 | 1/2005 |
| JP | 2005-56649 A | 3/2005 |
| JP | 3708183 B2 | 10/2005 |
| JP | 2005-310569 A | 11/2005 |
| JP | 2006-19093 A | 1/2006 |
| JP | 2006-216411 A | 8/2006 |
| JP | 2007-107048 A | 4/2007 |
| JP | 3985805 B2 | 10/2007 |
| JP | 2008-27823 A | 2/2008 |
| JP | 2008-218244 A | 9/2008 |
| JP | 2008-251213 A | 10/2008 |
| JP | 2008-305645 A | 12/2008 |
| JP | 2009-52126 A | 3/2009 |
| JP | 2009-54531 A | 3/2009 |
| JP | 2009-181782 A | 8/2009 |
| JP | 2009-259424 A | 11/2009 |
| JP | 2009-259739 A | 11/2009 |
| JP | 2009-277604 A | 11/2009 |
| JP | 2009-289637 A | 12/2009 |
| JP | 2010-97764 A | 4/2010 |
| JP | 2010-97822 A | 4/2010 |
| JP | 2010-157415 A | 7/2010 |
| WO | WO 2008/016152 A1 | 2/2008 |
| WO | WO 2008/084883 A2 | 7/2008 |
| WO | WO 2009/107657 A1 | 9/2009 |
| WO | WO 2009/150917 A1 | 12/2009 |
| WO | WO 2010/001975 A1 | 1/2010 |
| WO | WO-2010146701 A1 * | 12/2010 .......... H01M 2/1241 |

OTHER PUBLICATIONS

Office Action dated Jun. 2, 2016 in U.S. Appl. No. 14/069,972.
Notice of Allowance dated Feb. 24, 2016 in U.S. Appl. No. 14/732,415.
United States Office Action dated Oct. 7, 2015 in U.S. Appl. No. 14/732,415.
United States Office Action dated Jan. 28, 2015 in co-pending U.S. Appl. No. 14/254,624.
Wei Lei et al., "Study on Reinforcing and Toughening of Polyphenylene Sulfide", China Plastics Industry, pp. 19-21, Apr. 2009.
United States Office Action dated Jul. 2, 2014 in U.S. Appl. No. 14/254,624.

(56) References Cited

OTHER PUBLICATIONS

United States Office Action dated Aug. 14, 2013, in U.S. Appl. No. 13/336,954.
Notice of Allowance dated Jul. 18, 2013 in U.S. Appl. No. 13/336,947.
U.S. Notice of Allowance dated Jul. 18, 2013, for U.S. Appl. No. 13/336,947.
U.S. Office Action for co-pending related U.S. Appl. No. 13/087,130 dated Nov. 13, 2012.
U.S. Office Action for co-pending related U.S. Appl. No. 13/087,146 dated Nov. 13, 2012.
Extended European Search Report dated May 7, 2012.
Extended European Search Report dated Apr. 17, 2012.
Specification (pp. 1-35) and Drawings (Figs. 1-7) of related co-pending U.S. Appl. No. 13/336,954, filed Dec. 23, 2011.
Specification (pp. 1-31) and Drawings (Figs. 1-7) of related co-pending U.S. Appl. No. 13/336,947, filed Dec. 23, 2011.
Specification (pp. 1-33) and Drawings (Figs. 1-7) of related co-pending U.S. Appl. No. 13/087,146, filed Apr. 14, 2011.
Specification (pp. 1-43) and Drawings (Figs. 1-8) of related co-pending U.S. Appl. No. 13/087,130, filed Apr. 14, 2011.

\* cited by examiner

F I G . 8
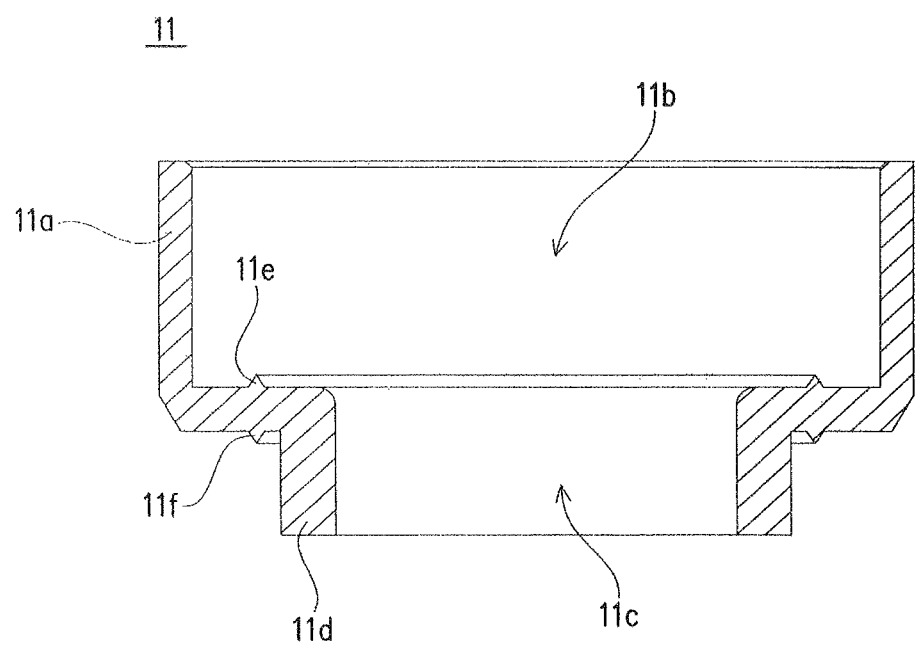

ELECTRIC STORAGE DEVICE

The present application is a Continuation application of U.S. patent application Ser. No. 13/354,193, filed on Jan. 19, 2012, which is based on and claims priority from Japanese Patent Application No. 2011-009921, filed on Jan. 20, 2011, and Japanese Patent Application No. 2011-009919, filed on Jan. 20, 2011, the entire contents of which are incorporated herein by reference.

FIELD OF THE INVENTION

The present invention relates to an electric storage device including an external terminal.

BACKGROUND ART

In recent years, rechargeable and dischargeable electric storage devices such as battery cells (e.g., a lithium ion battery cell and a nickel-metal hydride battery cell) and capacitors (e.g., an electric double layer capacitor) have been adopted as the power sources of vehicles (e.g., an automobile and a motorcycle) and various devices (e.g., a portable terminal and a laptop computer). For example, a battery cell includes an electrode assembly and a case composed of a case body which houses the electrode assembly and a cover plate which covers an opening of the case body. An external terminal is arranged at an outer surface of the cover plate, a current collector is connected to the electrode assembly, the current collector is arranged inside the case, and the external terminal and the current collector are directly or indirectly connected to each other. With this configuration, the external terminal and the electrode assembly are electrically connected.

There are two main methods for connecting an external terminal and a current collector. One is to directly connect an external terminal and a current collector, and the other is to indirectly connect an external terminal and a current collector via an auxiliary terminal and a connecting conductor.

The former method uses an external terminal which is composed of a body, a crimping part projecting from a lower surface of the body (and as necessary, a male thread part projecting from an upper surface of the body). The external terminal is arranged at an outer surface of a cover plate via a sealing member, the crimping part of the external terminal is inserted into a through-hole of a current collector inside a case, and an end portion of the crimping part projecting downward from the through-hole is crimped from below. With this configuration, the external terminal and the current collector are directly connected to each other.

The latter method uses an auxiliary terminal composed of a body, a first crimping part projecting from a lower surface of the body, and a second crimping part projecting from an upper surface of the body, an external terminal composed of a head and a male thread part projecting from an upper surface of the head, and a connecting conductor including through-holes into which the second crimping part of the auxiliary terminal and the male thread part of the external terminal are to be inserted. The auxiliary terminal is arranged at an outer surface of a cover plate via a sealing member, the first crimping part of the auxiliary terminal is inserted into a through-hole of a current collector inside a case, and an end portion of the first crimping part projecting downward from the through-hole is crimped from below. The external terminal is arranged at the outer surface of the cover plate via the sealing member or via a terminal retainer provided separately from the sealing member, the second crimping part of the auxiliary terminal and the male thread part of the external terminal are inserted into the through-holes of the connecting conductor, and an end portion of the second crimping part projecting upward from the through-hole is crimped from above. With this configuration, the external terminal and the current collector are indirectly connected via the auxiliary terminal and the connecting conductor.

The battery cell described in Patent Document 1 (JP-A-2006-216410 is fabricated by the former method as mentioned above. An external terminal (electrode guide pin 6) includes a body (head 6B) and a crimping part (columnar part 6A). An insulating sealing member (insulating member 4) includes a surrounding circumferential outer wall part, a recess inside the outer wall, a through-hole in the bottom surface of the recess and an annular projection (tubular part 4B) that projects around the through-hole, the annular projection being inserted through a through-hole (through hole 10) formed in the cover plate (metal plate 3). The body (head 6B) of the external terminal (electrode guide pin 6) is inserted through a recess of the insulating sealing member (insulating member 4). The crimping part (column part 6A) is inserted through a through-hole of a connection part (conductive tab connection plate 11) of a current collector via the through-hole in the bottom surface of the recess. An end portion of the crimping part, which projects downward from the through-hole of the connection part (conductive tab connection plate 11), is crimped from below. In this manner, the external terminal (electrode guide pin 6) is attached to the cover plate (metal plate 3) while being electrically connected to the connection part (conductive tab connection plate 11) of the current collector and insulated from the cover plate (metal plate 3).

However, in the battery cell described in Patent Document 1, the cover plate (metal plate 3) is made of a soft material such as an aluminum-based metallic material. Because of this, when the external terminal (electrode guide pin 6) is crimped, the surface of the cover plate (metal plate 3) is subjected to compression stress and deformed due to pressing force from the insulating sealing member (insulating member 4), which leads to a decrease in flatness. This results in reducing the degree of contact between the surface of the cover plate (metal plate 3) and the surface of the insulating sealing member (insulating member 4), and therefore impairing sealing performance in this region. Furthermore, if the insulating sealing member (insulating member 4) is harder than the cover plate (metal plate 3), creep occurs in the insulating sealing member (insulating member 4), which also results in reducing the degree of contact between the surface of the cover plate (metal plate 3) and the surface of the insulating sealing member (insulating member 4), and therefore impairing sealing performance in this region.

This problem occurs not only in battery cells but also in capacitors (e.g., a double layer capacitor and the like) as well.

SUMMARY OF THE INVENTION

An object of the present invention is to provide an electric storage device having a structure that can reliably produce the sealing effect between a case and a sealing member.

The present invention provides an electric storage device including:

an electrode assembly;

a case that includes a defining wall and houses the electrode assembly;

a sealing member that is arranged on the defining wall; and a conductive member that is electrically connected to the electrode assembly, the conductive member being supported by the sealing member, wherein at least a portion of the defining wall where the sealing member is arranged comprises an aluminum-based metallic material; and the sealing member comprises a material that is softer than the material for the at least a portion of the defining wall where the sealing member is arranged.

In an embodiment of the present invention, the electric storage device may have a configuration in which:

the sealing member comprises an engineering plastic.

In this instance, the sealing member may comprise polyphenylene sulfide (PPS) resin and elastomer.

Furthermore, in this instance, the elastomer may be contained in an amount of 2 to 20% by weight.

In another embodiment of the present invention, the electric storage device may have a configuration in which:

the sealing member has a Rockwell hardness (R scale) of 55 to 120.

In an embodiment of the present invention, the electric storage device may have a configuration in which the sealing member is arranged on an outer surface of the defining wall, the device further including:

a terminal retainer arranged on the outer surface of the defining wall; and an external terminal that is supported by the terminal retainer, wherein the conductive member is an auxiliary terminal that passes through the defining wall and is electrically connected to the external terminal.

The electric storage device may have a configuration in which the sealing member is arranged on an outer surface of the defining wall, the device further including:

an external terminal that is supported, together with the conductive member, by the sealing member, wherein the conductive member is an auxiliary terminal that passes through the defining wall and is electrically connected to the external terminal.

The electric storage device may have a configuration in which:

the sealing member is arranged on an outer surface of the defining wall; and the conductive member is an external terminal that passes through the defining wall.

In these instances, the electric storage device may have a configuration in which:

the sealing member includes a surrounding circumferential outer wall part and a recess inside the outer wall part; and the outer wall part is formed to be high enough for the recess to entirely or substantially entirely receive a body of the auxiliary terminal and a head of the external terminal.

In another embodiment of the present invention, the electric storage device may have a configuration in which:

a space is provided between the outer wall part of the sealing member and the body of the auxiliary terminal.

The electric storage device may have a configuration in which:

a space is provided between the outer wall part of the sealing member and the head of the external terminal.

In still another embodiment of the present invention, the electric storage device may have a configuration in which:

the sealing member has a through-hole formed in a bottom surface of the recess and an annular projection that projects around the through-hole to be inserted through a through-hole formed in the case;

the auxiliary terminal includes a crimping part that projects from the body and is crimped in a state where the crimping part has been inserted through the through-hole of the sealing member and a through-hole formed in a current collector; and the crimping part has a hollow portion having a length that does not reach a position of an inner surface of the case.

The electric storage device may have a configuration in which:

the sealing member has a through-hole formed in a bottom surface of the recess and an annular projection that projects around the through-hole to be inserted through a through-hole formed in the case;

the external terminal includes a crimping part that projects from the head and is crimped in a state where the crimping part has been inserted through the through-hole of the sealing member and a through-hole formed in a current collector; and the crimping part has a hollow portion having a length that does not reach a position of an inner surface of the case.

The electric storage device may have a configuration in which:

the conductive member is crimped in such a manner that the sealing member is pressed against the defining wall.

Furthermore, the present invention provides a method of manufacturing an electric storage device, the device comprising:

an electrode assembly;

a case that includes a defining wall and houses the electrode assembly;

a sealing member that is arranged on the defining wall; and a conductive member that is electrically connected to the electrode assembly, the conductive member being supported by the sealing member, wherein at least a portion of the defining wall where the sealing member is arranged comprises an aluminum-based metallic material; and the sealing member comprises a material that is softer than the material for the at least a portion of the defining wall where the sealing member is arranged, the method comprising:

crimping the conductive member in such a manner that the sealing member is pressed against the defining wall.

BRIEF DESCRIPTION OF THE DRAWINGS

FIG. 8 is a cross-sectional view of an outer gasket of the terminal part; and

DETAILED DESCRIPTION OF THE PREFERRED EMBODIMENTS

Figure 1:
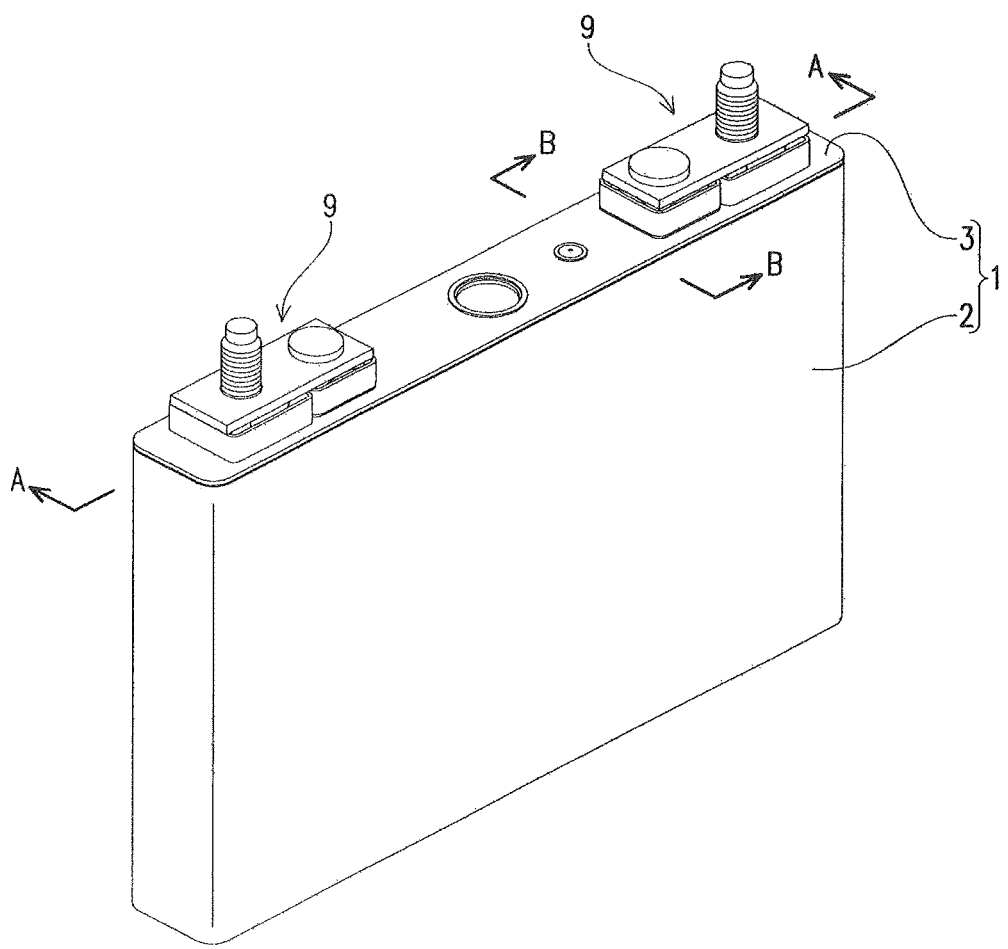
FIG. 1 is a perspective view of a battery cell according to an embodiment of the present invention.
Figure 2:
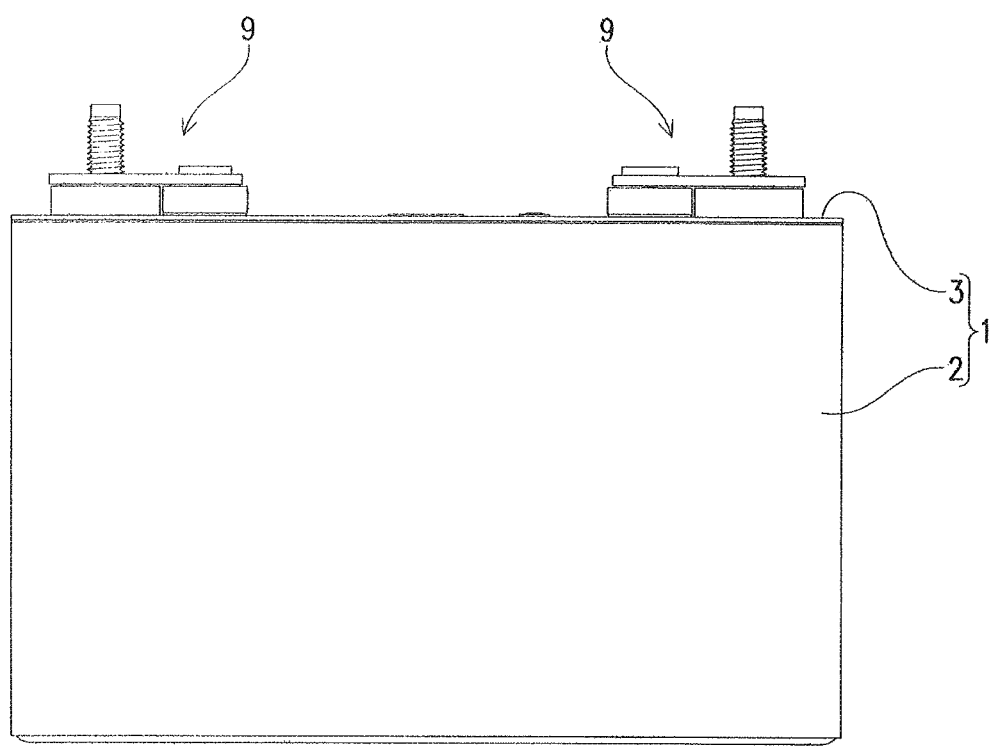
FIG. 2 is a side view of the battery cell.
Figure 3:
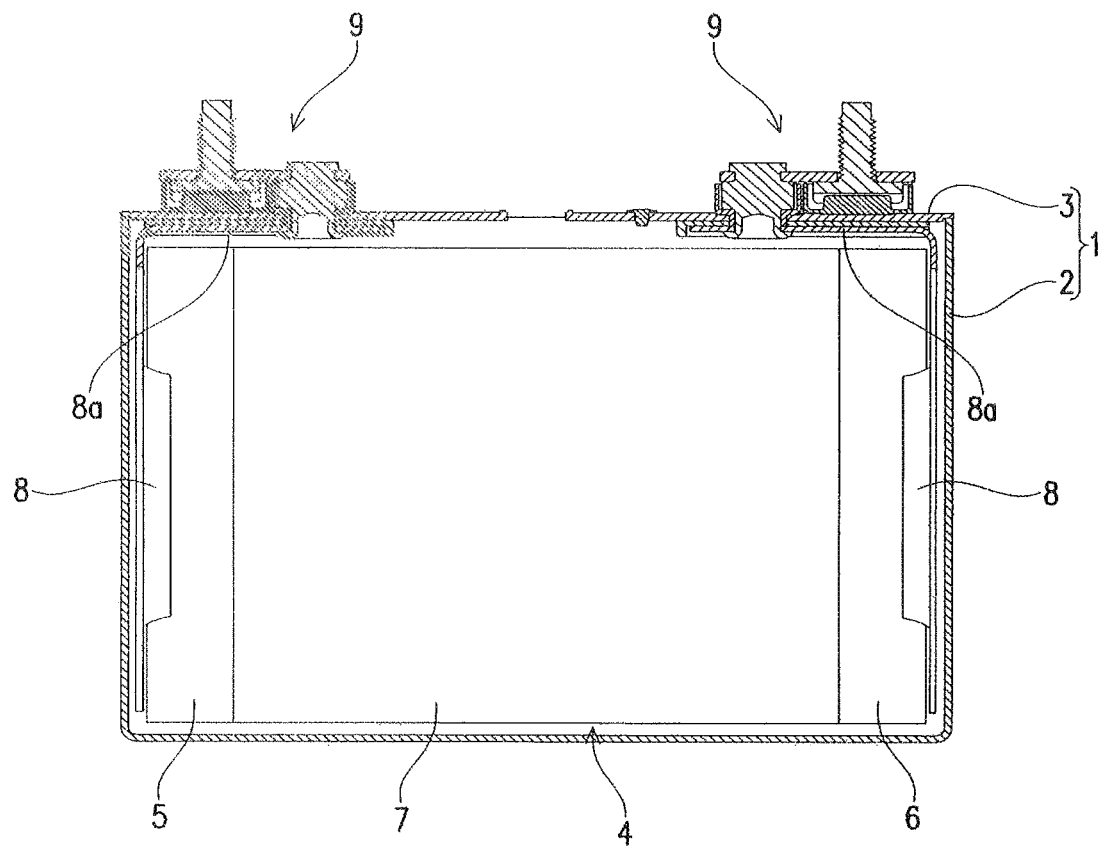
FIG. 3 is a cross-sectional view taken along line A-A in FIG. 1.
Figure 4:
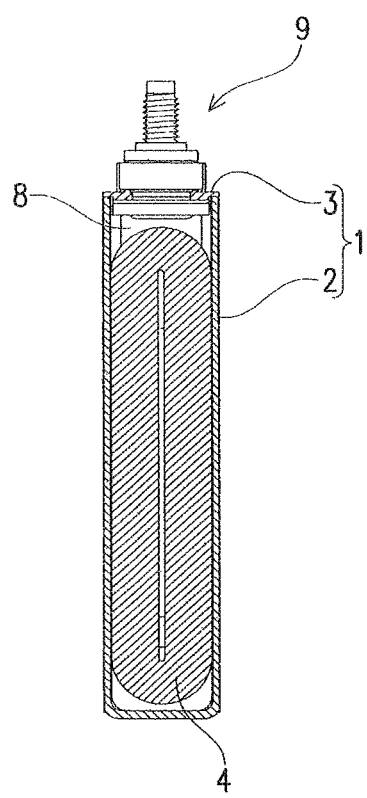
FIG. 4 is a cross-sectional view taken along line B-B in FIG. 1.

A battery cell which is an embodiment of an electric storage device according to the present invention is described below with reference to the drawings. A battery cell according to the present embodiment is a non-aqueous electrolyte secondary battery cell and, more particularly, a lithium ion secondary battery cell. As shown in FIGS. 1 to 4, the battery cell according to the present embodiment includes a case 1 which is composed of a case body 2 and a cover plate 3 which covers an opening of the case body 2 to seal the case 1. The cover plate 3 includes terminal structures 9 which are electrically connected to an electrode assembly 4 housed in the case 1.

The case body 2 and cover plate 3 of the case 1 are metal members comprising an aluminum-based material such as aluminum and an aluminum alloy. The case body 2 is a rectangular box that is flat in the width direction so as to house a wound electrode assembly 4 that has been formed into an elliptic cylinder. The cover plate 3 is a rectangular plate material corresponding in shape to the opening of the case body 2. The cover plate 3 fits in the opening of the case body 2 and is fixed to the case body 2 by laser welding or the like so as to seal the opening.

In the electrode assembly 4, a band-shaped positive electrode sheet 5 and a band-shaped negative electrode sheet 6 which are displaced to each other in different lateral directions with a band-shaped separator 7 sandwiched therebetween are wound about a lateral rotation axis into a cylinder in the shape of a vertically long ellipse. The electrode assembly 4 is entirely covered with an insulating cover (not shown) comprising an insulating sheet and is housed in the case 1 while being insulated from the case 1. The positive electrode sheet 5 includes aluminum foil carrying a positive electrode active material at the surface. The negative electrode sheet 6 includes copper foil carrying a negative electrode active material at the surface. The positive electrode sheet 5 and the negative electrode sheet 6 each have a non-overlapped portion not coated with the active material at an edge in the lateral direction in which the sheet is displaced. With this arrangement, at the lateral ends of the electrode assembly 4, the aluminum foil and copper foil are exposed, and thus these metal foils of the positive electrode and negative electrode project from the overlapped portion in a wound configuration.

Metal foils projecting at the lateral ends of the electrode assembly 4 are electrically connected to respective current collectors 8. The current collectors 8 are vertically long conductive metal members. More specifically, the current collector 8 for the positive electrode comprises aluminum or an aluminum alloy, and the current collector 8 for the negative electrode comprises copper or a copper alloy. An upper part of each current collector 8 is horizontally bent to constitute a connection part 8a. A part extending downward from the connection part 8a is divided into a front part and a rear part, which project downward. The two front and rear parts are sandwiched between holding plates (not shown) together with the corresponding end of the electrode assembly 4 and are connected and fixed by ultrasonic welding or the like.

Figure 5:
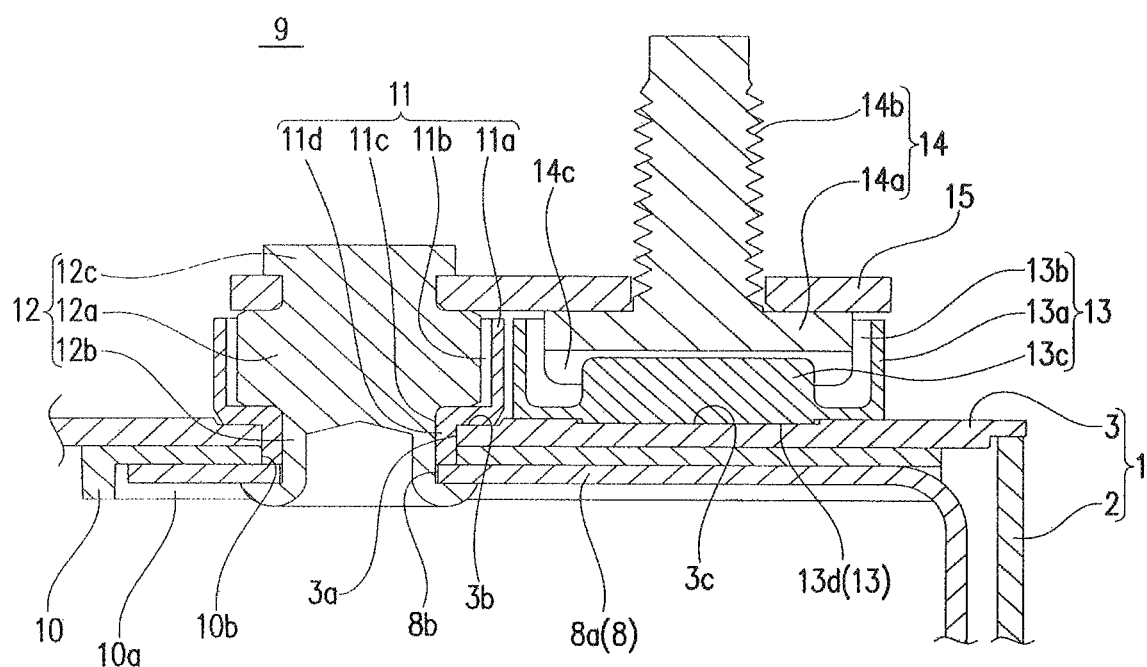
FIG. 5 is an enlarged cross-sectional view of a terminal part of the battery cell.
Figure 6:
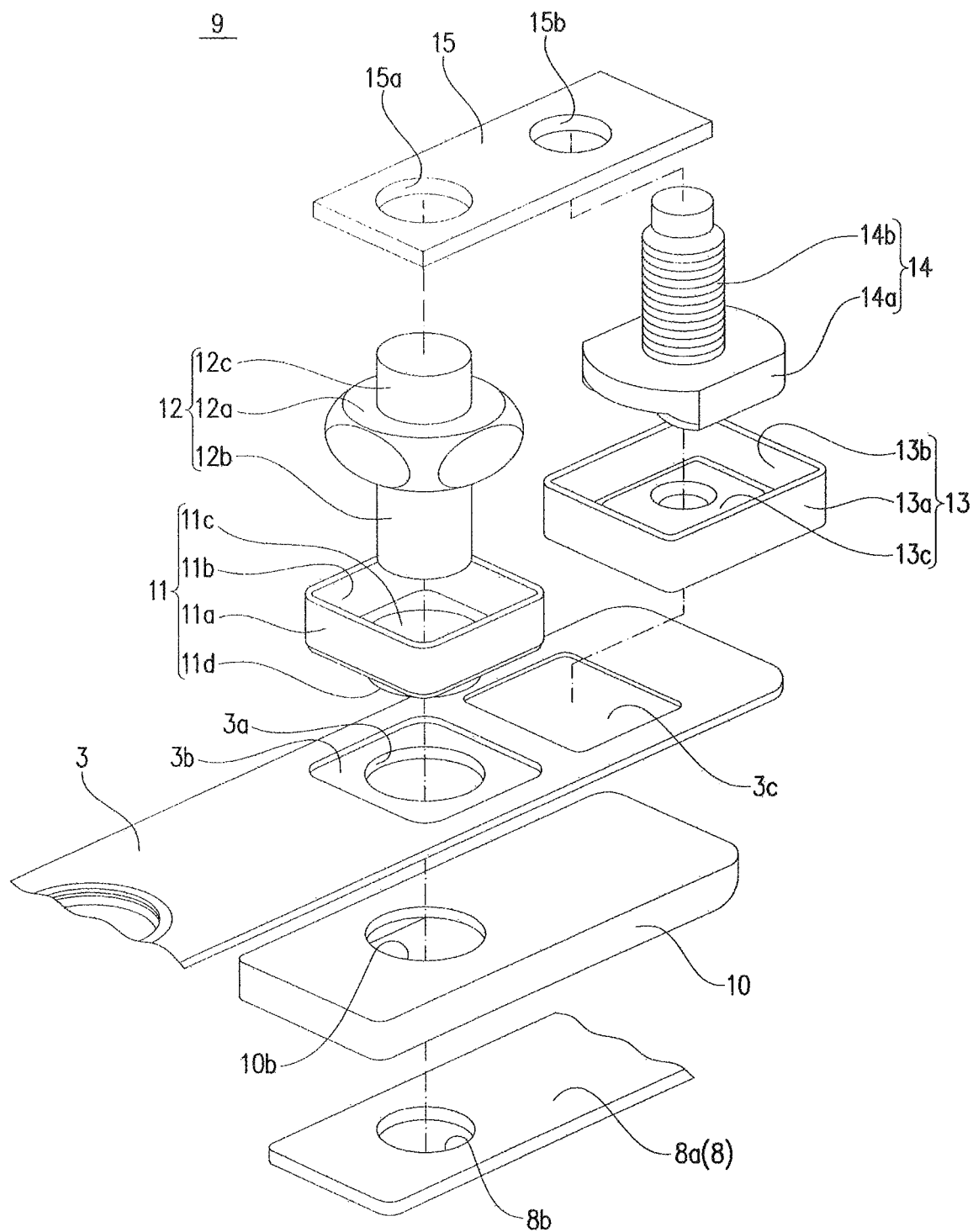
FIG. 6 is an exploded perspective view of the terminal part as seen from above.
Figure 7:
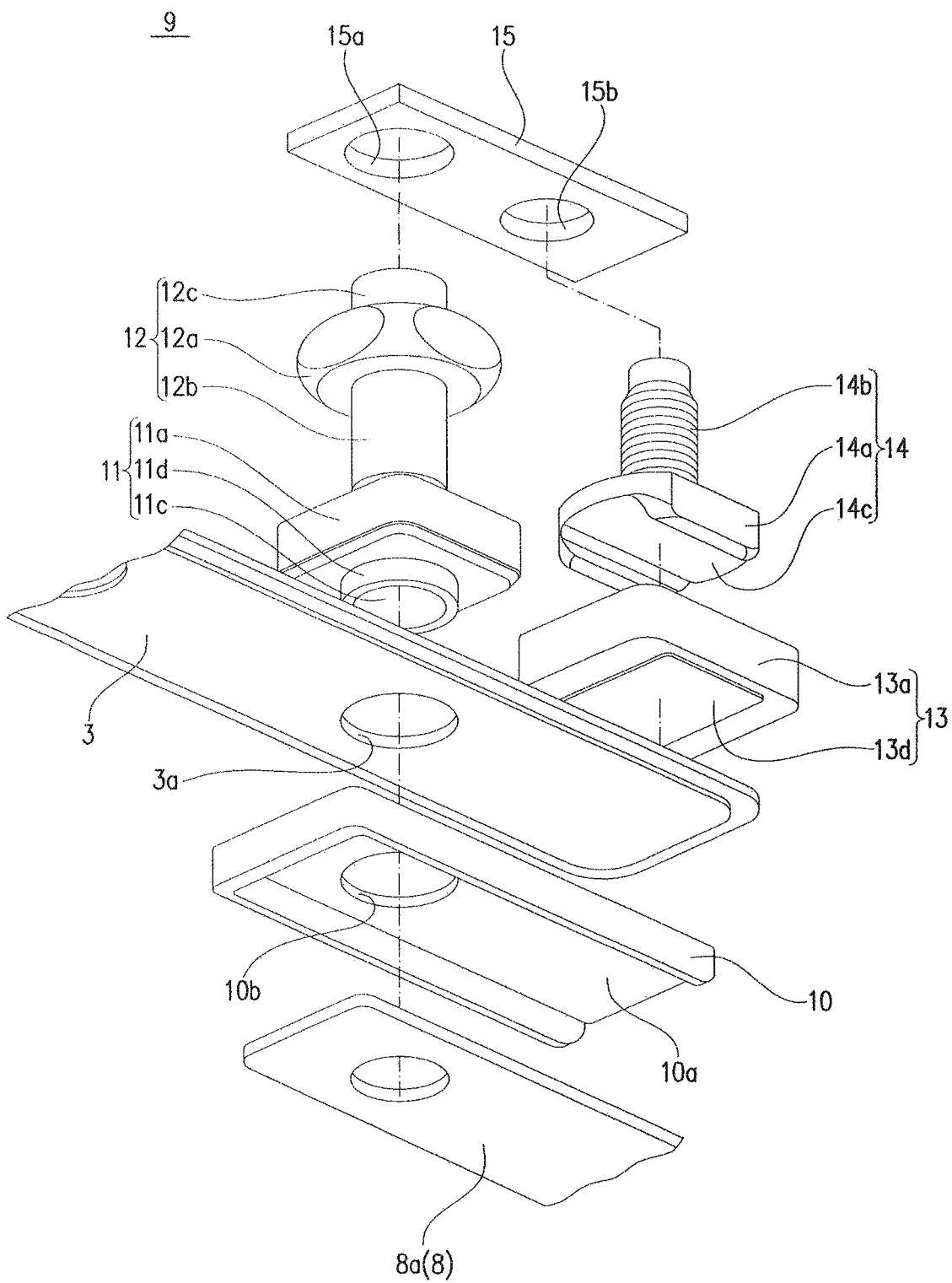
FIG. 7 is an exploded perspective view of the terminal part as seen from below.

The terminal structures 9 include the terminal structure 9 for the positive electrode and the terminal structure 9 for the negative electrode. As shown in more detail in FIGS. 5 to 7, each terminal structure 9 includes a plastic plate 10, an outer gasket 11, a rivet 12, a terminal retainer 13, a terminal bolt 14, and a connecting plate 15. The plastic plate 10 and outer gasket (gasket) 11 are arranged inside and outside the case 1 with through-holes 3a formed in the right and left ends of the cover plate 3 interposed therebetween. The rivet 12 is inserted into the through-hole 3a via the plastic plate 10 and outer gasket 11 and is electrically connected to the connection part 8a of the current collector 8. The terminal retainer 13 is arranged close to the outer gasket 11. The terminal bolt 14 is arranged at an outer surface of the cover plate 3 via the terminal retainer 13. The connecting plate 15 electrically connects the terminal bolt 14 and the rivet 12. With this configuration, the electrode assembly 4 inside the case 1 and the terminal bolt 14 are electrically connected to each other.

It is to be noted that the plastic plate 10, the outer gasket 11 and the terminal retainer 13 are made of plastic, and therefore each represent a plastic member. Also, the plastic plate 10, outer gasket 11, and terminal retainer 13 have an insulating function and therefore each represent an insulating member. In particular, the outer gasket 11 (and the plastic plate 10 in some instances) has a sealing function and thus also represents a sealing member. The rivet 12 represents an auxiliary terminal. The terminal bolt 14 represents an external terminal. The connecting plate 15 represents a connecting conductor.

The plastic plate 10 is a synthetic resin with at least insulating properties. More specifically, an example of materials used for the plastic plate 10 is a thermoplastic resin material obtained by uniformly mixing polyphenylene sulfide (PPS) resin with a polyolefin elastomer containing at least one of polyethylene (PE) and polypropylene (PP). (The weight ratio of the elastomer to the thermoplastic resin material, i.e., the content of the elastomer in the thermoplastic resin material preferably ranges from 2 to 20% by weight, and more preferably from 2 to 10% by weight.) However, the material is not limited to this, and any appropriate material may be selected as long as it is softer than the cover plate 3. The plastic plate 10 has a rectangular shape. A lower surface of the plastic plate 10 includes a recess 10a which can receive the connection part 8a of the current collector 8. The plastic plate 10 includes a through-hole 10b which coincides in position with a through-hole 8b formed in the connection part 8a while the recess 10a receives the connection part 8a of the current collector 8.

The outer gasket 11 is a synthetic resin with insulating properties and sealing properties. More specifically, an example of materials used for the outer gasket 11 is a thermoplastic resin material obtained by uniformly mixing polyphenylene sulfide (PPS) resin with a polyolefin elastomer containing at least one of polyethylene (PE) and polypropylene (PP). (The weight ratio of the elastomer to the thermoplastic resin material, i.e., the content of the elastomer in the thermoplastic resin material preferably ranges from 2 to 20% by weight, and more preferably from 2 to 10% by weight.) However, the material is not limited to this, and any appropriate material may be selected as long as it is softer than the cover plate 3. The components of the material of the outer gasket 11 can be identified by thermal decomposition GC/MS measurement, IR measurement and the like. The blend ratio of the elastomer in the outer gasket 11 can be found by: dipping the outer gasket 11 in an organic solvent such as xylene; dissolving the elastomer in the resin; and measuring the weight ratio of the elastomer to the base material (PPS). Furthermore, whether or not the outer gasket has been compressed can be checked by: finding the compression state of the outer gasket 11; measuring the dimension after release (after release of compression); and observing the cross section of the outer gasket 11 in the compression state. In addition, a thermal shock test can be carried out to check whether or not sealing is ensured by the outer gasket 11.

The outer gasket 11 is slightly larger than a body 12a of the rivet 12 and has a rectangular shape. The outer gasket 11 includes a surrounding circumferential outer wall part 11a at the outer periphery, which is formed by recessing an upper surface except for the outer periphery. The outer gasket 11 includes a recess 11b (also referred to as an "inner space of the outer wall part") which can receive the body 12a of the rivet 12 inside the outer wall part 11a. The outer gasket 11 includes a through-hole 11c into which a first crimping part 12b of the rivet 12 can be inserted while the recess 11b receives the body 12a of the rivet 12. A lower surface of the outer gasket 11 includes an annular projection 11d (also referred to as a "shaft") which extends through the through-hole 3a of the cover plate 3 and is inserted into the through-hole 10b of the plastic plate 10. A bottom surface of the recess 11b of the outer gasket 11 includes a (circularly extending) projecting ridge 11e (also referred to as "projection") formed around the through-hole 11c, and the lower surface of the outer gasket 11 includes a (circularly extending) projecting ridge 11f (also referred to as "projection") formed around the annular projection 11d (cf., FIG. 8).

It is to be noted that the plastic plate 10 is arranged on a lower surface (an inner surface) of the cover plate 3 and is thus arranged inside the case 1. The outer gasket 11 is arranged at an upper surface (the outer surface) of the cover plate 3 and is thus arranged at an outer surface of the case 1. A region of the upper surface of the cover plate 3 where the outer gasket 11 is arranged includes a non-circular recess (first recess) 3b which can receive a lower part (bridge part) of the outer gasket 11. When the lower part (a joining surface to the cover plate 3) of the outer gasket 11 is inserted into the first recess 3b, the outer gasket 11 is restrained from rotating about its axis. It is to be noted that, in the present embodiment, the first recess 3b is formed to be rectangular so as to correspond to the shape of the rectangular lower part of the outer gasket 11. The first recess 3b is formed by coining or the like.

The rivet 12 is a conductive metal member. More specifically, the rivet 12 for the positive electrode comprises aluminum or an aluminum alloy while the rivet 12 for the negative electrode comprises copper or a copper alloy. The first crimping part 12b projects downward from a lower surface of the body 12a of the rivet 12. A second crimping part 12c projects upward from an upper surface of the body 12a of the rivet 12. It is to be noted that, in the present embodiment, the first crimping part 12b is hollow (tubular) while the second crimping part 12c is solid (columnar). More specifically, the first crimping part 12b has a circular tubular shape while the second crimping part 12c has a circular columnar shape. However, the shape is not limited to this, and any appropriate shape can be selected.

The dimensional relationship among the through-hole 3a of the cover plate 3, the through-hole 8b of the connection part 8a of the current collector 8, the through-hole 10b of the plastic plate 10, the through-hole 11c and annular projection 11d of the outer gasket 11, and the first crimping part 12b of the rivet 12 will be described. As shown in detail in FIG. 5, the inner diameter of the through-hole 3a of the cover plate 3 and the inner diameter of the through-hole 10b of the plastic plate 10 are the same or substantially the same. The inner diameter of the through-hole 3a of the cover plate 3 and the inner diameter of the through-hole 10b of the plastic plate 10 are the same or substantially the same as the outer diameter of the annular projection 11d of the outer gasket 11. The length of the annular projection 11d of the outer gasket 11 is the same or substantially the same as the sum of the thicknesses of the cover plate 3 and plastic plate 10. The inner diameter of the annular projection 11d of the outer gasket 11 and the inner diameter of the through-hole 8b of the connection part 8a of the current collector 8 are the same or substantially the same. The inner diameter of the annular projection 11d of the outer gasket 11 and the inner diameter of the through-hole 8b of the connection part 8a of the current collector 8 are the same or substantially the same as the outer diameter of the first crimping part 12b of the rivet 12. The length of the first crimping part 12b of the rivet 12 is the same or substantially the same as the sum of the thicknesses of the cover plate 3, the connection part 8a of the current collector 8, the plastic plate 10, and the outer gasket 11.

Accordingly, the body 12a of the rivet 12 is inserted into the recess 11b of the outer gasket 11, the first crimping part 12b of the rivet 12 extends through the through-hole 11c at a bottom surface of the recess 11b and is inserted into the through-hole 8b of the connection part 8a of the current collector 8, and an end portion of the first crimping part 12b projecting downward from the through-hole 8b of the connection part 8a is crimped from below. With this configuration, the rivet 12 is attached to the cover plate 3 while the rivet 12 is electrically connected to the connection part 8a of the current collector 8 and is insulated from the cover plate 3.

The terminal retainer 13 is a synthetic resin with insulating properties, like the plastic plate 10 and outer gasket 11. It is to be noted that a reinforced resin material obtained by uniformly mixing polyphenylene sulfide resin with glass fiber as a filler, for example, is used as the material for the terminal retainer 13 in order to make the hardness higher than those of the plastic plate 10 and outer gasket 11. Alternatively, polytetrafluoroethylene-perfluoroalkylvinylether copolymer (PFA) resin is used instead of polyphenylene sulfide resin. An inorganic fiber other than glass fiber may be used. However, the material is not limited to this, and any appropriate material can be selected. However, the terminal retainer 13 may not have insulating properties. When aluminum or an aluminum alloy is used as a material for the case 1, the terminal retainer 13 of the positive electrode may be non-isolated so that the potential of the positive electrode may be identical with the potential of the case 1. This suppresses corrosion of the case 1. When iron or stainless steel is used as a material for the case 1, the terminal retainer 13 of the negative electrode may be non-isolated so that the potential of the negative electrode may be identical with the potential of the case 1. In order for the positive electrode or negative electrode and the case 1 to have an identical potential, the terminal retainer 13 may comprise a material containing a conductive material (e.g., carbon) as well as a filler mixed therein so that the terminal retainer 13 becomes semi-conductive, for example.

The terminal retainer 13 is slightly larger than a head 14a of the terminal bolt 14 and has a rectangular shape. The terminal retainer 13 includes a surrounding circumferential outer wall part 13a at the outer periphery, which is formed by recessing an upper surface except for the outer periphery. The terminal retainer 13 includes a recess 13b which can receive the head 14a of the terminal bolt 14 inside the outer wall part 13a. The terminal retainer 13 includes a non-circular fitting projection 13c in the recess 13b. The fitting projection 13c fits in a non-circular fitting recess (fitting groove) 14c formed in the head 14a of the terminal bolt 14 while the recess 13b receives the head 14a of the terminal bolt 14. Accordingly, when the fitting projection 13c in the recess 13b (i.e., the fitting projection 13c at a lower position than an upper end surface of the outer wall part 11a in the recess 13b) fits in the fitting recess 14c of the head 14a of the terminal bolt 14, the terminal retainer 13 receives the terminal bolt 14 while the terminal bolt 14 is restrained from rotating about its axis. It is to be noted that, in the present embodiment, the fitting recess 14c of the terminal bolt 14 is formed by cutting out a part extending from one side to the opposite side and has a rectangular shape. The fitting projection 13c of the terminal retainer 13 is formed to be rectangular so as to correspond to the rectangular fitting recess 14c.

A lower surface of the terminal retainer 13 includes a non-circular projection 13d. In the present embodiment, the projection 13d is a rectangular projecting surface (raised surface). A region of the upper surface of the cover plate 3 where the terminal retainer 13 is arranged includes a non-circular recess (second recess) 3c which can receive the projection 13d of the terminal retainer 13. When the projection 13d of the terminal retainer 13 is inserted into the second recess 3c, the terminal retainer 13 is restrained from rotating about its axis, like the outer gasket 11. It is to be noted that, in the present embodiment, the second recess 3c is formed to be rectangular so as to correspond to the rectangular projection 13d. The second recess 3c is formed by coining or the like.

When the terminal retainer 13 is to be arranged on the upper surface of the cover plate 3, the lower surface (including a surface of the projection 13d) of the terminal retainer 13 is treated by appropriate means so that the glass fiber is exposed at the lower surface of the terminal retainer 13. A preferred example of the appropriate means is to mechanically cut off the lower surface of the terminal retainer 13. For example, the glass fiber is exposed by cutting the lower surface of the terminal retainer 13 with a file or the like. The projection 13d at the lower surface of the terminal retainer 13 fits in the second recess 3c at the upper surface of the cover plate 3, and the terminal retainer 13 is fixed to the upper surface of the cover plate 3. A method for fixing the terminal retainer 13 to the cover plate 3 is not particularly limited. For example, appropriate adhesive means (e.g., an adhesive film, a liquid adhesive, or a solid adhesive) may be supplied to at least one of the upper surface (in particular, the second recess 3c) of the cover plate 3 and the lower surface of the terminal retainer 13, and the terminal retainer 13 may be fixed to the cover plate 3 via the adhesive means. Although a common adhesive can be used as the adhesive, an epoxy resin adhesive may preferably be used. An epoxy resin has poor adhesion to the synthetic resin used for the terminal retainer 13 but has good adhesion to an inorganic fiber. Accordingly, the glass fiber exposed at the lower surface of the terminal retainer 13 allows the terminal retainer 13 to be firmly bonded to the cover plate 3.

The terminal bolt 14 is intended to electrically connect the battery cell to an external device. The terminal bolt 14 is a conductive metal member with high strength made of iron, steel such as stainless steel and chromium molybdenum steel, or the like. As described above, the terminal bolt 14 includes the head 14a sized to be inserted into the recess 13b of the terminal retainer 13 and a shaft 14b projecting from an upper surface of the head 14a and having a male thread at an outer peripheral surface. A lower surface of the head 14a includes a non-circular fitting recess (fitting groove) 14c, as described above. Accordingly, when the fitting projection 13c in the recess 13b fits in the fitting recess 14c, the terminal bolt 14 is insulated from the cover plate 3 and is supported on the terminal retainer 13 while the shaft 14b is restrained from rotating about its axis.

The connecting plate 15 is a rectangular conductive metal member comprising a copper alloy or the like. A surface of the connecting plate 15 is subjected to surface treatment such as plating with nickel, plating with zinc and the like for preventing rust, improving slipperiness, and other purposes. The connecting plate 15 includes a first through-hole 15a at one end and a second through-hole 15b at the other end. The second crimping part 12c of the rivet 12 is inserted into the first through-hole 15a. The shaft 14b of the terminal bolt 14 is inserted into the second through-hole 15b. An end portion of the second crimping part 12c of the rivet 12 which projects upward from the first through-hole 15a of the connecting plate 15 is crimped from above. With the crimping, the rivet 12 and connecting plate 15 are integrated.

It is to be noted that, in the terminal bolt 14, the shaft 14b is simply inserted into the second through-hole 15b of the connecting plate 15. However, for example, when a crimp contact of a lead wire of an external device (not shown) fits on the shaft 14b of the terminal bolt 14, and the shaft 14b of the terminal bolt 14 is fixed with a nut, the terminal bolt 14 is slightly lifted, and the upper surface of the head 14a comes into pressure contact with a lower surface of the connecting plate 15. This causes the crimp contact of the lead wire together with the connecting plate 15 to be held between the head 14a of the terminal bolt 14 and the nut. With this configuration, the crimp contact, terminal bolt 14, and connecting plate 15 are electrically connected to one another with reliability. Accordingly, the crimp contact of the lead wire is electrically connected to the electrode assembly 4 via the terminal bolt 14, connecting plate 15, rivet 12 and current collector 8 which are insulated from the cover plate 3 by the terminal retainer 13, outer gasket 11, and plastic plate 10. This causes the external device to be electrically connected to the battery cell.

Additionally, the fitting recess 14c of the head 14a of the terminal bolt 14 fitting on the fitting projection 13c in the recess 13b of the terminal retainer 13 fixed on the upper surface of the cover plate 3 reliably stops the terminal bolt 14 from rotating together with the nut when the nut is fixed to the shaft 14b of the terminal bolt 14. Even if there is some clearance between the fitting recess 14c of the head 14a of the terminal bolt 14 and the fitting projection 13c in the recess 13b of the terminal retainer 13, the terminal bolt 14 only rotates idly by a certain degree and poses no special problem.

At this time, since the terminal retainer 13 stops the terminal bolt 14 from rotating, the terminal retainer 13 receives rotational torque from the terminal bolt 14. However, the lower surface of the terminal retainer 13 with the glass fiber exposed is in intimate contact with the upper surface of the cover plate 3, and therefore the terminal retainer 13 is fixed with increased frictional resistance against the cover plate 3. Accordingly, the terminal retainer 13 is reliably stopped from rotating together with the terminal bolt 14 due to rotational torque from the terminal bolt 14. The second recess 3c of the upper surface of the cover plate 3 and the projection 13d at the lower surface of the terminal retainer 13 fitting in with each other make the rotation-stopping effect more remarkable. As described above, since adhesive means (e.g., an adhesive) is supplied to one of the upper surface (in particular, the second recess 3c) of the cover plate 3 and the lower surface of the terminal retainer 13, and the terminal retainer 13 is fixed to the cover plate 3 by the adhesive means, stopping of rotation is further ensured.

It is to be noted that if the perimeter of the shaft 14b (male thread part) of the terminal bolt 14 is smaller, i.e., the shaft 14b of the terminal bolt 14 has a smaller diameter, and a synthetic resin such as polyphenylene sulfide resin (PPS) is used alone as the material for the terminal retainer 13, the terminal retainer 13 may not withstand rotational torque from the terminal bolt 14. However, mixing of a synthetic resin with an inorganic fiber such as glass fiber enhances the strength of the terminal retainer 13. The mixing also contributes to cost reduction.

Since the terminal retainer 13 is provided separate from the outer gasket 11 at the cover plate 3, rotational torque is not transmitted to the outer gasket 11, which seals up a gap around the rivet 12. Accordingly, unintentional force is not applied to the outer gasket 11. Sealing with the outer gasket 11 (more specifically, sealing between the lower surface of the outer gasket 11 and the upper surface of the cover plate 3 (an upper surface of the first recess 3b), sealing between an outer peripheral surface of the annular projection 11d of the outer gasket 11 and an inner peripheral surface of the through-hole 3a of the cover plate 3 and an inner peripheral surface of the through-hole 10b of the plastic plate 10, and sealing between an inner peripheral surface of the annular projection 11d of the outer gasket 11 and an outer peripheral surface of the first crimping part 12b of the rivet 12) is not impaired.

Rotational torque applied to the shaft 14b of the terminal bolt 14 is not transmitted to the rivet 12, which is provided separate from the terminal bolt 14. Accordingly, a situation does not occur in which rotation of the rivet 12 causes the rivet 12 and the connection part 8a of the current collector 8 fixed by crimping to come loose to impair the connection therebetween. Additionally, unintentional force is not applied to the plastic plate 10 and outer gasket 11. Further, sealing with the plastic plate 10 and outer gasket 11 (more specifically, sealing between an upper surface of the plastic plate 10 and the lower surface of the cover plate 3, sealing between the lower surface of the outer gasket 11 and the upper surface of the cover plate 3 (the upper surface of the first recess 3b), sealing between the outer peripheral surface of the annular projection 11d of the outer gasket 11 and the inner peripheral surface of the through-hole 3a of the cover plate 3 and the inner peripheral surface of the through-hole 10b of the plastic plate 10, and sealing between the inner peripheral surface of the annular projection 11d of the outer gasket 11 and the outer peripheral surface of the first crimping part 12b of the rivet 12) is not impaired.

The separate provision of the outer gasket 11 and the terminal retainer 13 allows appropriate selection of a material with suitable hardness for a sealing member as the material for the outer gasket 11 and appropriate selection of a material with sufficient hardness to withstand rotational torque from the terminal bolt 14 as the material for the terminal retainer 13. More specifically, since the outer gasket 11 has a greater sealing effect when the outer gasket 11 deforms elastically to come into intimate contact with surfaces of the conductive members (the cover plate 3, current collector 8, and rivet 12), the outer gasket 11 is required to have a certain degree of flexibility. If the terminal retainer 13 is highly flexible, rotational torque from the terminal bolt 14 makes the fitting projection 13c likely to be worn and chipped. As the wear progresses, the rotation-stopping function of the terminal bolt 14 is impaired. For this reason, the terminal retainer 13 is required to have rigidity enough to withstand rotational torque from the terminal bolt 14.

The outer gasket 11, because of the elastomer blended therein, is softer than the cover plate 3 that comprises an aluminum-based metallic material. Because of this, when the first crimping part 12b of the rivet 12 is crimped, the outer gasket 11, rather than the cover plate 3, is elastically deformed. This prevents the surface of the cover plate 3 from being subjected to compression stress and (plastically) deformed due to pressing force from the outer gasket 11, and thus prevents a decrease in flatness. In addition, since the outer gasket 11 comprises a soft material, creep is less likely to occur. This prevents a decrease in the degree of contact between the surface (upper surface) of the cover plate 3 and the surface (lower surface) of the outer gasket 11 (the degree of contact between the contact surface of the cover plate 3 and the contact surface of the outer gasket 11), and therefore reliably produces the sealing effect. This is also applicable to the plastic plate 10 when the plastic plate 10 has a sealing function.

Lithium ion battery cells for use in vehicles or the like, which are required to have a long life, often employ a gasket harder than one used in small lithium ion battery cells for a portable use or the like in order to maintain sealing of the gasket. Continuous use of a soft gasket in a compressed state causes creep, which leads to an increased occurrence of deformation. This makes it impossible to maintain sealing, resulting in a decrease in cell performance. A correlative relationship exists between the probability of creep occurrence and the hardness, and therefore the use of a gasket having a predetermined or higher hardness ensures sealing over a long time period. In this respect, the outer gasket 11 preferably has a Rockwell hardness (R scale) of 55 or more, and more preferably of 110 or more while preferably having a Rockwell hardness (R scale) of 120 or less, and more preferably of 118 or less. More specifically, the outer gasket 11 preferably has a Rockwell hardness (R scale) of 55 or more and 120 or less, more preferably of 110 or more and 120 or less, and still more preferably of 110 or more and 118 or less.

When tetrafluoroethylene-perfluoroalkyl vinylether copolymer (PFA) having a Rockwell hardness (R scale) of 50 was used in a gasket, it was not provided with sufficient durability. In contrast, with the use of polyphenylene sulfide (PPS) resin having a Rockwell hardness (R scale) of 118 blended with an elastomer was used, the gasket had good durability.

In the rivet 12 according to the present embodiment, the dimension in an axial direction of the body 12a is set to be larger than that of a conventional one so as to prevent or reduce plastic deformation across the rivet 12 caused by crimping by the first crimping part 12b and second crimping part 12c. As a result, the position in height of the connecting plate 15 from the upper surface of the cover plate 3 is necessarily higher than that in a conventional terminal structure. The fitting projection 13c of the terminal retainer 13 according to the present embodiment is a part which directly receives rotational torque from the terminal bolt 14 when the terminal retainer 13 stops the terminal bolt 14 from rotating. Accordingly, the fitting projection 13c of the terminal retainer 13 needs to have a sufficient thickness in a direction of height so as to have strength enough to withstand rotational torque. As a result, the position in height of the head 14a of the terminal bolt 14 is high, and the position in height of the connecting plate 15 from the upper surface of the cover plate 3 is also necessarily higher than that in a conventional terminal structure. For this reason, in the present embodiment, the outer wall part 11a of the outer gasket 11 is high, and the creepage distance from the upper surface of the cover plate 3 to the upper end surface of the outer wall part 11a is long (the ratio of the creepage distance to the width dimension of the cover plate 3 is preferably 0.15 to 0.3). The outer wall part 13a of the terminal retainer 13 is high, and the creepage distance from the upper surface of the cover plate 3 to an upper end surface of the outer wall part 13a is long (the ratio of the creepage distance to the width dimension of the cover plate 3 is preferably 0.15 to 0.3).

More specifically, the outer wall part 11a of the outer gasket 11 is formed so as to entirely or substantially entirely cover the body 12a of the rivet 12 and such that the upper end surface of the outer wall part 11a is in contact with or is slightly spaced from the lower surface of the connecting plate 15. The outer wall part 13a of the terminal retainer 13 is formed so as to entirely or substantially entirely cover the head 14a of the terminal bolt 14 and such that the upper end surface of the outer wall part 13a is in contact with or is slightly spaced from the lower surface of the connecting plate 15.

With the above-described configuration, even if the battery cell is exposed to droplets of water generated by condensation or the like or a conductive atmosphere (static electricity or dust), the outer wall part 11a of the outer gasket 11 and the outer wall part 13a of the terminal retainer 13 serve as covers (or barriers). This conveniently prevents a short between the cover plate 3 and the rivet 12 and a short between the cover plate 3 and the terminal bolt 14.

Figure 9:
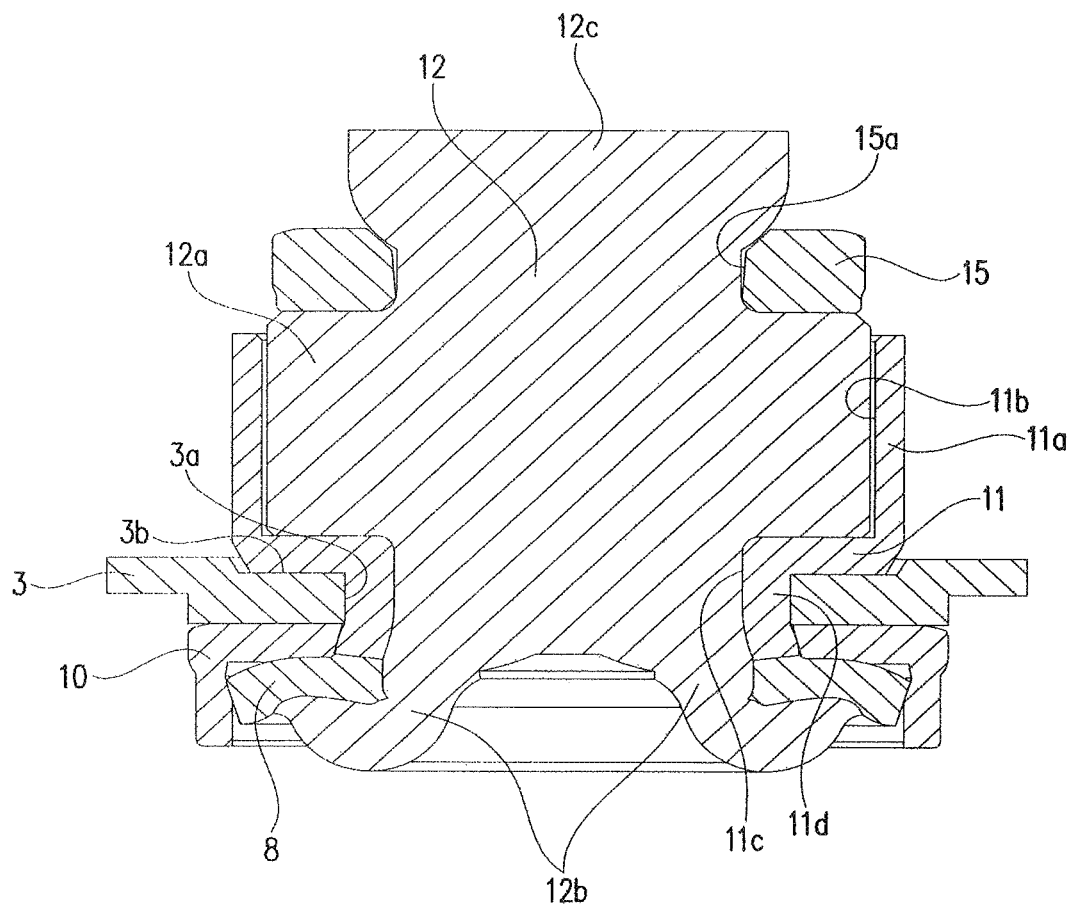
FIG. 9 is a cross-sectional view of a terminal part in the outer gasket.

As shown in FIG. 9, a space is left between the outer wall part 11a of the outer gasket 11 and the body 12a of the rivet 12. More specifically, the recess 11b of the outer gasket 11 has a rectangular shape, and the body 12a of the rivet 12 has a shape resulting from a round shape with its four sides cut in conformity to the shape of the recess 11b of the outer gasket 11. The distance between opposite ones of the cut off surfaces is designed to be shorter than the distance between opposite ones of the inner surfaces of the outer wall part 11a of the outer gasket 11, thereby leaving a space between the inner surface of the outer wall part 11a of the outer gasket 11 and the cut off surfaces of the body 12a of the rivet 12.

This arrangement allows the body 12a of the rivet 12 to be inserted into the recess 11b of the outer gasket 11 without interfering with the inner surface of the outer wall part 11a of the outer gasket 11. This reliably brings the lower end surface of the body 12a of the rivet 12 into close contact with the bottom surface of the recess 11b of the outer gasket 11, so that a desired sealing effect is produced between the outer gasket 11 and the rivet 12.

As shown in FIG. 9, the crimping part 12b of the rivet 12 has a hollow portion having a length that does not reach the position of the lower surface (inner surface) of the cover plate 3. That is, the top (the innermost portion) of the hollow portion of the first crimping part 12b of the rivet 12 is arranged to be located below the lower surface (inner surface) of the cover plate 3 (in an instance in which the cell case 1 is placed so that the cover plate 3 is positioned upward).

This arrangement prevents or reduces deformation of the first crimping part 12b toward the inside of the hollow portion when the first crimping part 12b of the rivet 12 is crimped, so that the diameter of the first crimping part 12b can be reliably enlarged. This increases the pressing force of the first crimping part, with its diameter enlarged, against the annular projection 11d of the outer gasket 11 (and in turn, the pressing force of the annular projection 11d of the outer gasket 11 against the through-hole 3a of the cover plate 3). This results in an increase in the degree of contact between the outer circumferential surface of the first crimping part 12b and the inner circumferential surface of the annular projection 11d of the outer gasket 11 and the degree of contact between the outer circumferential surface of the annular projection 11d of the outer gasket 11 and the inner circumferential surface of the through-hole 3a of the cover plate 3. Thus, the desired sealing effect can be produced in the region.

This sealing effect becomes significant in the arrangement in which: the projection 11e of the outer gasket 11 is in contact with the lower end surface of the body 12a of the rivet 12 with intensive pressure while surrounding the through-hole 11c in the bottom surface of the recess 11b of the outer gasket 11 (i.e., surrounding the first crimping part 12b of the rivet 12); and the other projection 11f of the outer gasket 11 is in contact with the upper surface (outer surface) of the cover plate 3, more specifically the flat surface of the first recess 3b formed in the upper surface of the cover plate 3, with intensive pressure while surrounding the annular projection 11d on the lower surface of the outer gasket 11 (i.e., surrounding the through-hole 3a of the cover plate 3).

It is noted that an electric storage device according to the present invention is not limited to the above-described embodiment and that various changes may be made without departing from the spirit and scope of the present invention.

The above embodiment has illustrated an example of a battery cell having a structure in which an external terminal and a current collector are indirectly connected to each other via an auxiliary terminal and a connecting conductor, and in which the auxiliary terminal is arranged on the outer surface of the case via an insulating sealing member and the external terminal is arranged on the outer surface of the case via a terminal retainer provided separately from the insulating sealing member. However, the present invention is applicable to a battery cell having a structure in which an insulating sealing member and a terminal retainer are integrated with each other, and also applicable to the batter cell described in Patent Document 1 as mentioned above (the battery cell having a structure in which an external terminal and a current collector are directly connected to each other).

The above embodiment has also illustrated an example in which the entire lower surface of the outer gasket 11 fits in the first recess 3b in the upper surface of the cover plate 3. Alternatively, a projection may be formed at the lower surface of the outer gasket 11, the first recess of the cover plate 3 may be sized to receive the projection, and the projection of the outer gasket 11 may fit in the first recess, as with the case of the terminal retainer 13.

The above embodiment has also illustrated an example in which the projection 13d is formed in the lower surface of the terminal retainer 13, the second recess 3c sized to receive the projection 13d is formed in the upper surface of the cover plate 3, and the projection 13d of the terminal retainer 13 fits in the second recess 3c of the cover plate 3. Alternatively, the projection 13d may not be formed, the second recess of the cover plate 3 may be sized to receive the entire lower surface of the terminal retainer 13, and the entire lower surface of the terminal retainer 13 may fit in the second recess, as with the case of the outer gasket 11.

Alternatively, the first recess 3b may not be formed in the cover plate 3, so that the outer gasket 11 may be arranged at a flat part of the upper surface of the cover plate 3. The second recess 3c may not be formed in the cover plate 3, so that the terminal retainer 13 may be arranged at a flat part of the upper surface of the cover plate 3.

It is preferred, however, that the cover plate 3 have the first recess 3b and second recess 3c because they can increase the moment of area of the cover plate 3, which results in enhancement of the mechanical strength of the cover plate 3. In this case, reducing the size of one of the first recess 3b and the second recess 3c increases the distance between the first recess 3b and the second recess 3c. This prevents the first recess 3b and second recess 3c from affecting each other. The above embodiment has illustrated an example in which the first recess 3b for the outer gasket 11 is larger than the second recess 3c for the terminal retainer 13. This configuration is adopted on the ground that the flatness and mechanical strength of the cover plate 3 increase with an increase in the area of the first recess 3b, which results in an increase in sealing effect and durability.

For either the outer gasket 11 or the terminal retainer 13, the number of projections is not limited to one, and a plurality of projections may be formed. The outer gasket 11 and terminal retainer 13 need not be rectangular. For example, the outer gasket 11 and terminal retainer 13 may be circular, hexagonal, or octagonal.

The above embodiment has illustrated an example in which the current collector 8 for the positive electrode and the rivet 12 for the positive electrode comprises aluminum or an aluminum alloy while the current collector 8 for the negative electrode and the rivet 12 for the negative electrode comprises copper or a copper alloy. However, any materials may be used as long as the materials are conductive metallic materials appropriate to the type of a battery cell. The above embodiment has also illustrated the materials for the terminal bolt 14 and connecting plate 15. However, any materials may be used as long as the materials are conductive metallic materials whose properties such as strength and conductivity are appropriate.

The above embodiment has illustrated an example in which the shaft (male thread part) 14b projects from the upper surface of the head 14a of the terminal bolt 14. However, a shaft in an appropriate form such as a circular or polygonal tube may project instead of the male thread part, and a threaded hole may be formed in an upper end surface of the shaft.

The electrode assembly is not limited to one of the winding type in the form of an elliptic cylinder as described in the above embodiment. The electrode assembly may have any other shape and may be one of the stacking type.

The above embodiment has illustrated an example in which the case 1 comprises an aluminum alloy, steel, or the like. However, any material may be used for the case 1 (the case body 2 and cover plate 3). Accordingly, a material other than metal, such as an insulating material, can be used. The shape and structure of the case 1 (the case body 2 and cover plate 3) are not limited to those described in the above embodiment, and any shape and structure may be adopted.

The above embodiment has illustrated an example in which the terminal structures 9 are arranged at the cover plate 3. However, the terminal structures 9 may be arranged at the case body 2.

In the above embodiment, the terminal retainer 13, the outer gasket 11 and the plastic plate 10 are each made of a material having insulating properties to provide insulation between the terminal bolt 14 and the cover plate 3. However, the present invention is not limited to this. For example, when the defining wall of the case 1 and the electrode assembly 14 are electrically connected to each other via the rivet 12, the terminal retainer 13, the outer gasket 11, or the plastic plate 10 may have electrical conductivity. As a method to give electrical conductivity to the terminal retainer 13, the outer gasket 11, or the plastic plate 10, a material having electrical conductivity such as carbon may be mixed with synthetic resin. Alternatively, the outer gasket 11 and the plastic plate 10 may not be provided, and the rivet 12 and the cover plate may be in direct contact with each other.

The above embodiment has been described in the context of a lithium ion secondary battery cell. However, the type and size (capacity) of a battery cell may be arbitrarily selected.

The present invention is not limited to lithium ion secondary battery cells and can also be applied to various secondary battery cells, primary battery cells, and capacitors such as an electric double layer capacitor.

What is claimed is:

1. An electric storage device, comprising:
   an electrode assembly;
   a case that includes a defining wall and houses the electrode assembly;
   a sealing member that is arranged on the defining wall;
   a conductive member that is electrically connected to the electrode assembly, the conductive member being supported by the sealing member, the conductive member including a body arranged on the sealing member, a first crimping part projecting downward from a lower surface of the body of the conductive member, and a second crimping part projecting upward from an upper surface of the body of the conduct member; and
   a connecting plate interposed between the body of the conductive member and the second crimping part in a direction perpendicular to the defining wall,
   wherein the sealing member includes:
      an outer wall part which supports the conductive member; and
      a projection portion which extends, from a bottom surface of the sealing member, below the outer wall part,
   wherein the defining wall includes:
      a recess which receives the bottom surface of the sealing member; and
      a through-hole which is formed in the recess and through which the projection portion of the sealing member is inserted,
   wherein at least a portion of the recess where the sealing member is arranged comprises an aluminum-based metallic material,
   wherein the sealing member includes a material that is softer than the material for the at least a portion of the defining wall where the sealing member is arranged,
   wherein the sealing member comprises polyphenylene sulfide (PPS) resin and an elastomer,
   wherein the elastomer is contained in an amount of 2% to 20% by weight,
   wherein the conductive member is crimped in such a manner that the sealing member is pressed against the defining wall,
   wherein the first crimping part includes a hollow portion, a top surface of the hollow portion extending below a bottom surface of the defining wall,
   wherein the body of the conductive member is thicker than the recess, and
   wherein, when viewed in the direction perpendicular to the defining wall, an outer diameter of the body of the conductive member is larger than an inner diameter of the through-hole.

2. The electric storage device according to claim 1, wherein the sealing member comprises an engineering plastic and is in direct contact with the lower surface of the body of the conductive member in the direction perpendicular to the defining wall.

3. The electric storage device according to claim 1, wherein the sealing member has a Rockwell hardness (R scale) of 55 to 120.

4. The electric storage device according to claim 1, wherein the sealing member is arranged on an outer surface of the defining wall, the electric storage device further comprising:
   a terminal retainer arranged on the outer surface of the defining wall; and
   an external terminal that is supported by the terminal retainer,
   wherein the conductive member includes an auxiliary terminal that passes through the defining wall and is electrically connected to the external terminal.

5. The electric storage device according to claim 4, wherein the auxiliary terminal includes a body and an insertion part that is formed continuously with the body of the auxiliary terminal,
   wherein another recess is located inside the outer wall part, and
   wherein the outer wall part is formed to be high enough for the another recess to entirely receive the body of the auxiliary terminal.

6. The electric storage device according to claim 5, wherein a space is provided between the outer wall part of the sealing member and the body of the auxiliary terminal.

7. The electric storage device according to claim 5, further comprising:
   a current collector that electrically connects the electrode assembly to the auxiliary terminal, the current collector including a through-hole and being housed in the case together with the electrode assembly,
   wherein the sealing member includes a through-hole formed in a bottom surface of the recess, and the projection portion projects around the through-hole of the sealing member to be inserted through the through-hole of the defining wall,
   wherein the insertion part of the auxiliary terminal includes the first crimping part that is crimped in a state where the first crimping part has been inserted through the through-hole of the sealing member and the through-hole of the current collector
   wherein the hollow portion of the first crimping part has a length that does not reach a position of an inner surface of the case, and
   wherein a tip end of the projection portion is in direct contact with the current collector in the direction perpendicular to the defining wall.

8. The electric storage device according to claim 1, wherein the sealing member is arranged on an outer surface of the defining wall, the electric storage device further comprising:
   a terminal retainer arranged on the outer surface of the defining wall;
   an external terminal that is supported by the terminal retainer;
   a current collector that electrically connects the electrode assembly to an auxiliary terminal of the conductive member; and
   a plastic plate disposed between the current collector and a cover plate of the case.

9. The electric storage device according to claim 8, wherein the terminal retainer comprises a filler that causes the terminal retainer having a hardness higher than a hardness of the plastic plate.

10. The electric storage device according to claim 9, wherein the filler causes the terminal retainer having a hardness higher than a hardness of the sealing member.

11. The electric storage device according to claim 1, further comprising an external terminal,
   wherein the conductive member comprises an auxiliary terminal that passes through the defining wall and is electrically connected to the external terminal.

12. The electric storage device according to claim 11, further comprising a flat connecting conductor that electrically connects the external terminal and the auxiliary terminal, the flat connecting conductor being spaced apart from and extending substantially parallel to an outer surface of the defining wall.

13. A method of manufacturing an electric storage device, the electric storage device comprising:
   an electrode assembly;
   a case that includes a defining wall and houses the electrode assembly; a sealing member that is arranged on the defining wall;
   a conductive member that is electrically connected to the electrode assembly, the conductive member being supported by the sealing member, the conductive member including a body arranged on the sealing member, a first crimping part projecting downward from a lower surface of the body of the conductive member, and a second crimping part projecting upward from an upper surface of the body of the conductive member; and
   a connecting plate interposed between the body of the conductive member and the second crimping part in a direction perpendicular to the defining wall,
   wherein the sealing member includes:
     an outer wall part which supports the conductive member; and
     a projection portion which extends, from a bottom surface of the sealing member, below the outer wall part,
   wherein the defining wall includes:
     a recess which receives the bottom surface of the sealing member; and
     a through-hole which is formed in the recess and through which the projection portion of the sealing member is inserted,
   wherein at least a portion of the recess where the sealing member is arranged comprises an aluminum-based metallic material,
   wherein the sealing member includes a material that is softer than the material for the at least a portion of the defining wall where the sealing member is arranged,
   wherein the sealing member comprises polyphenylene sulfide (PPS) resin and an elastomer,
   wherein the elastomer is contained in an amount of 2% to 20% by weight,
   wherein the conductive member is crimped in such a manner that the sealing member is pressed against the defining wall, wherein the first crimping part includes a hollow portion, a top surface of the hollow portion extending below a bottom surface of the defining wall,
   wherein the body of the conductive member is thicker than the recess, and wherein, when viewed in the direction perpendicular to the defining wall, an outer diameter of the body of the conductive member is larger than an inner diameter of the through-hole.

* * * * *